(12) United States Patent
Schremmer et al.

(10) Patent No.: US 9,719,480 B2
(45) Date of Patent: Aug. 1, 2017

(54) METHOD FOR CONTROLLING THE TRIGGERING OF IGNITION IN AN INTERNAL COMBUSTION ENGINE

(71) Applicant: BorgWarner Ludwigsburg GmbH, Ludwigsburg (DE)

(72) Inventors: Torsten Schremmer, Ludwigsburg (DE); Steffen Bohne, Ludwigsburg (DE)

(73) Assignee: BORGWARNER LUDWIGSBURG GMBH, Ludwigsburg (DE)

( * ) Notice: Subject to any disclaimer, the term of this patent is extended or adjusted under 35 U.S.C. 154(b) by 149 days.

(21) Appl. No.: 14/739,096

(22) Filed: Jun. 15, 2015

(65) Prior Publication Data
US 2015/0361944 A1 Dec. 17, 2015

(30) Foreign Application Priority Data
Jun. 17, 2014 (DE) .................... 10 2014 108 521

(51) Int. Cl.
*F02P 5/15* (2006.01)
*F02P 7/02* (2006.01)
(Continued)

(52) U.S. Cl.
CPC .......... *F02P 5/1514* (2013.01); *F02P 5/1512* (2013.01); *F02P 5/1518* (2013.01); *F02P 7/02* (2013.01);
(Continued)

(58) Field of Classification Search
CPC ... F02P 11/00; F02P 11/02; F02P 11/06; F02P 5/1512; F02P 5/1514; F02P 5/1518; F02P 15/008
(Continued)

(56) References Cited

U.S. PATENT DOCUMENTS 4,502,446 A 3/1985 Kanegae et al.
4,658,786 A * 4/1987 Foss ................. F02P 15/008
123/406.13

(Continued)

FOREIGN PATENT DOCUMENTS

DE 100 17 543 A1 10/2001
JP H 6-2642 1/1994

*Primary Examiner* — Erick Solis
*Assistant Examiner* — Robert Werner
(74) *Attorney, Agent, or Firm* — Bose McKinney & Evans LLP

(57) ABSTRACT

A method for controlling an internal combustion engine. Target ignition times for the individual cylinders are given by an engine control device through trigger signals transmitted to the ignition control device. After receiving a trigger signal, the ignition control device activates the ignition device associated with this trigger signal to effect ignition in the respective cylinder. The ignition control device stores a firing order in which an ignition is to be cyclically effected in the individual cylinders, and it is checked whether trigger signals for all cylinders are received in the stored firing order, and if not, a substitutional ignition time is calculated for the at least one cylinder for which no trigger signal has been received, from at least two trigger signals for the cylinders or one of the remaining cylinders, and the respective ignition device or ignition devices are activated according to the calculated substitutional ignition time.

12 Claims, 2 Drawing Sheets

(51) Int. Cl.
    *F02P 17/00*     (2006.01)
    *F02P 17/02*     (2006.01)
(52) U.S. Cl.
    CPC .............. *F02P 17/00* (2013.01); *F02P 17/02*
                        (2013.01); *Y02T 10/46* (2013.01)
(58) Field of Classification Search
    USPC ............ 701/114; 123/406.13, 406.19, 406.2,
                         123/406.23; 73/114.62, 114.63
    See application file for complete search history.

(56) References Cited

U.S. PATENT DOCUMENTS

| | | | | |
|---|---|---|---|---|
| 4,661,778 | A | * | 4/1987 | Anderson .............. F02P 17/12 |
| | | | | 324/380 |
| 5,497,751 | A | * | 3/1996 | Ohtake .................. F02B 37/18 |
| | | | | 123/479 |
| 5,526,267 | A | * | 6/1996 | Sogawa ............... F02D 41/266 |
| | | | | 123/479 |
| 5,877,958 | A | * | 3/1999 | Horiuchi .............. F02D 41/266 |
| | | | | 701/102 |
| 2002/0116150 | A1 | | 8/2002 | Franke et al. |

* cited by examiner

METHOD FOR CONTROLLING THE TRIGGERING OF IGNITION IN AN INTERNAL COMBUSTION ENGINE

RELATED APPLICATIONS

This application claims priority to DE 10 2014 108 521.3, filed Jun. 17, 2014, the entire disclosure of which is hereby incorporated herein by reference in its entirety.

BACKGROUND

The invention is based on a method for controlling an internal combustion engine, which has a plurality of cylinders each having one ignition device, by means of an ignition control device to which the ignition devices are connected, wherein target ignition times for the individual cylinders are given by an engine control device by means of trigger signals which are transmitted to the ignition control device. After receiving a trigger signal, the ignition control device activates the ignition device associated with this trigger signal in order to effect an ignition in the respective cylinder.

Engine control devices of motor vehicles inform an ignition control device via trigger signals when an ignition has to take place in the individual cylinders of the engine. The ignition control device activates, based on the received trigger signals, ignition devices, for example a spark plug that effects an ignition by means of an arc discharge, or a corona igniter that effects an ignition by means of a corona discharge.

Performance and consumption of an engine are substantially influenced by the ignition times of the individual cylinders. The goal of each ignition control of an engine is therefore to effect an ignition of the fuel-air mixture that is in each case as close as possible to the optimal ignition time.

SUMMARY

The present invention provides a way of improving ignition control.

When operating a vehicle, it can happen that trigger signals for one or a plurality of cylinders of the engine are not initiated. Ignition control devices usually have a separate input for each cylinder, which is connected to the engine control device via a line for receiving trigger signals. Damage to these lines, a defective contact point or, for example, a defect at the input of the ignition control device can lead to the case that the ignition control no longer receives trigger signals for one or more cylinders. With the ignition control device according to this disclosure, ignition can be performed in all cylinders even in such a case, and engine operation can therefore be maintained with only minimal limitations compared to the failure of a cylinder.

Trigger signals are cyclically transmitted by an engine control device in a predetermined firing order of the cylinders. For a 6-cylinder engine, the firing order 1-5-3-6-2-4 can be used, for example. In this case, a cycle starts with a trigger signal for igniting the first cylinder followed by a trigger signal for igniting the fifth cylinder, then by a trigger signal for igniting the third cylinder, then for the sixth cylinder, the second cylinder and finally for the fourth cylinder.

With a method according to this disclosure, the firing order can be stored by the ignition control device so that the ignition control device can detect the failure of a trigger signal by comparing the stored firing order with the order of the received signals. However, storing the firing order in the ignition control device is not required. The ignition control device is able to detect a failure of a trigger signal even without knowing the firing order by detecting the interval between two successive trigger signals. Failure of a trigger signal leads to the fact that between the two trigger signals, between which the failed trigger should occur, the time interval is twice as long as between the remaining successive trigger signals. Such a noticeably long time interval between successive trigger signals is therefore indicative for a failure of a trigger signal. The ignition control device can then detect which ignition device in the past engine cycle has not been activated and can calculate a substitutional ignition time in future engine cycles for this ignition device and can activate these ignition devices according to the calculated substitutional ignition time.

The firing order can be determined by the ignition control device from the trigger signals received during the initial startup of the engine. Since the initial startup of an engine normally takes place at the manufacturer or in an auto shop, it can be assumed that all trigger signals are received correctly. If this is exceptionally not the case, this can be detected during the tests usually carried during an initial startup, and the error can be eliminated so that subsequently the firing order can be stored correctly.

If the trigger signal fails, for example, for the third cylinder due to a defect in this firing order, this is detected by the ignition control device at the latest when a trigger signal is received for the cylinder that is next in the firing order, thus the sixth cylinder in the mentioned example, without having previously received a trigger signal for the third cylinder. If a trigger signal for a cylinder is missing, it is assumed that this will also be the case in future engine cycles until the defect causing the failure of the trigger signal is corrected. As soon as it has been detected that the ignition control device does not receive trigger signals in the stored firing order for all cylinders, the ignition control device calculates a substitutional ignition time for the cylinder for which no trigger signal was received. This substitutional ignition time is calculated from at least two trigger signals for the cylinders or one of the remaining cylinders, in the simplest case from the target ignition times of the two cylinders immediately preceding in the firing order.

Failure of a trigger signal is very difficult to detect in the current engine cycle since the target ignition times can be suddenly shifted by the engine control device for the ignition control device. The ignition control device can differentiate a failure of a trigger signal from a shift of the ignition time from "early" to "late" only after the latest possible target ignition time has elapsed. However, by then it is usually too late to respond in the current engine cycle to the failed trigger signal and to effect an ignition in the respective cylinder. After detecting a failure of a trigger signal, a substitutional ignition time is therefore preferably calculated only for later engine cycles which follow the current engine cycle in which the failure has been detected for the first time. However, if a trigger signal should be received again in one of these later engine cycles for the respective cylinder, the ignition control device can assume that the defect has been fixed and can stop calculating a substitutional ignition time.

Calculating the substitutional time can be performed as extrapolation of the target ignition times defined by the trigger signals. In the simplest case, the substitutional ignition time is calculated by adding, to the target ignition time of the cylinder in the firing order immediately before the cylinder the trigger signal of which has failed, the time interval between this target ignition time and the target ignition time immediately preceding in the firing order. By considering further target ignition times, an ongoing change in the speed can be detected and the calculation can be improved. For example, by considering further target ignition times, a first time derivative of the extrapolation can be calculated and used for further improvement of the substitutional time. Moreover, derivatives of higher order can also be included in the extrapolation.

An advantageous refinement of this disclosure provides that the ignition control device reports to the engine control device if it does not receive the trigger signals for all cylinders in the stored firing order. The ignition control device can communicate to the engine control device for which cylinder or cylinders a trigger signal is no longer received, or only communicate that the trigger signal failed for at least one cylinder. The engine control device can respond to the receipt of such a message by avoiding some engine conditions, in particular engine conditions for which a calculation of a well-functioning substitutional ignition time is not possible or possible only to a limited extent. Such engine conditions are rapid and substantial changes in rotational speed.

This disclosure is particularly suitable for gasoline engines with four or more cylinders. However, the described method can principally also be implemented in engines with only one or two cylinders. If, in an engine with only two cylinders, the trigger signal for one of the two pistons fails, the substitutional ignition time can be calculated in the simplest case in that the time interval between the last two target ignition times of the cylinder for which trigger signals are received is halved and added to the last target ignition time of this cylinder.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
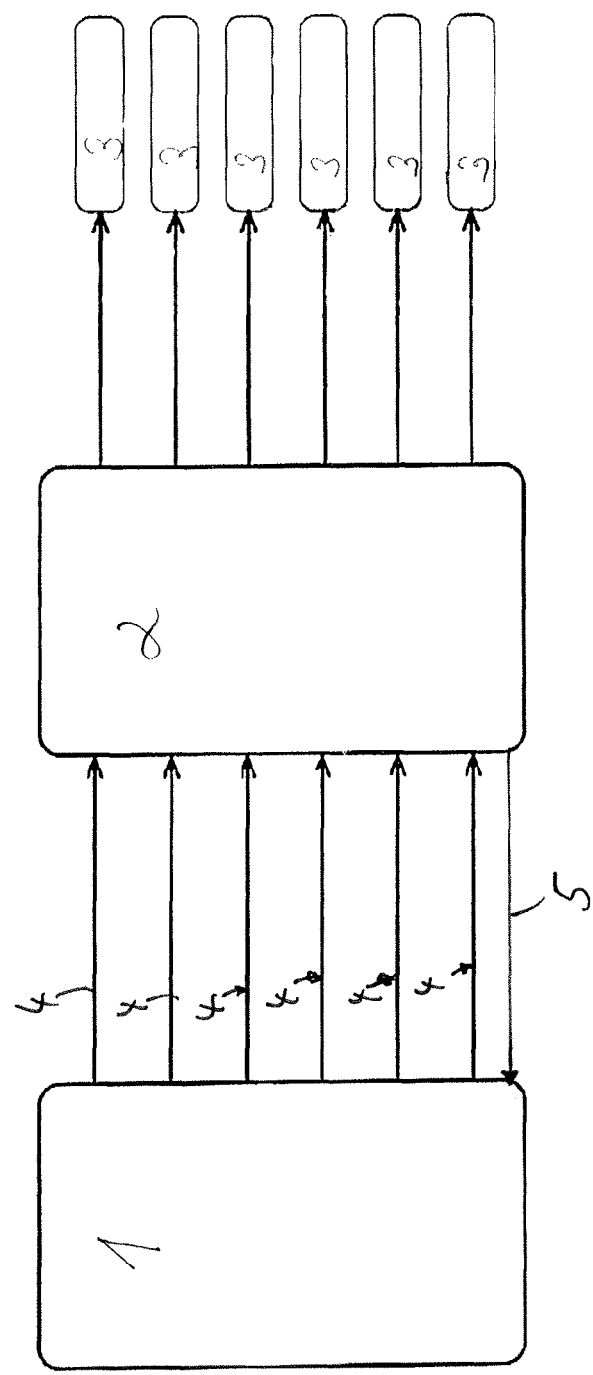
FIG. 1 shows a schematic illustration of a control system.

FIG. 1 schematically illustrates a system for controlling the ignition activity of an internal combustion engine, which can be a gasoline engine, for example. This system includes an engine control device 1, an ignition control device 2 and an ignition device 3 for each cylinder of the internal combustion engine. The engine control device 1 transmits trigger signals to the ignition control device 2. The trigger signals define target ignition times for the individual cylinders of the internal combustion engine. Receipt of such a trigger signal causes the ignition control device 2 to activate the ignition device 3 associated with this trigger signal and thus to effect an ignition in the respective cylinder.

In the illustrated embodiment, a separate line 4 from the engine control device 1 to the ignition control device 2 is provided for each cylinder of the internal combustion engine. Each of the lines 4 between the engine control device 1 and the ignition control device 2 thus transmits only trigger signals for a single cylinder of the combustion engine which is associated with this line.

Figure 2:
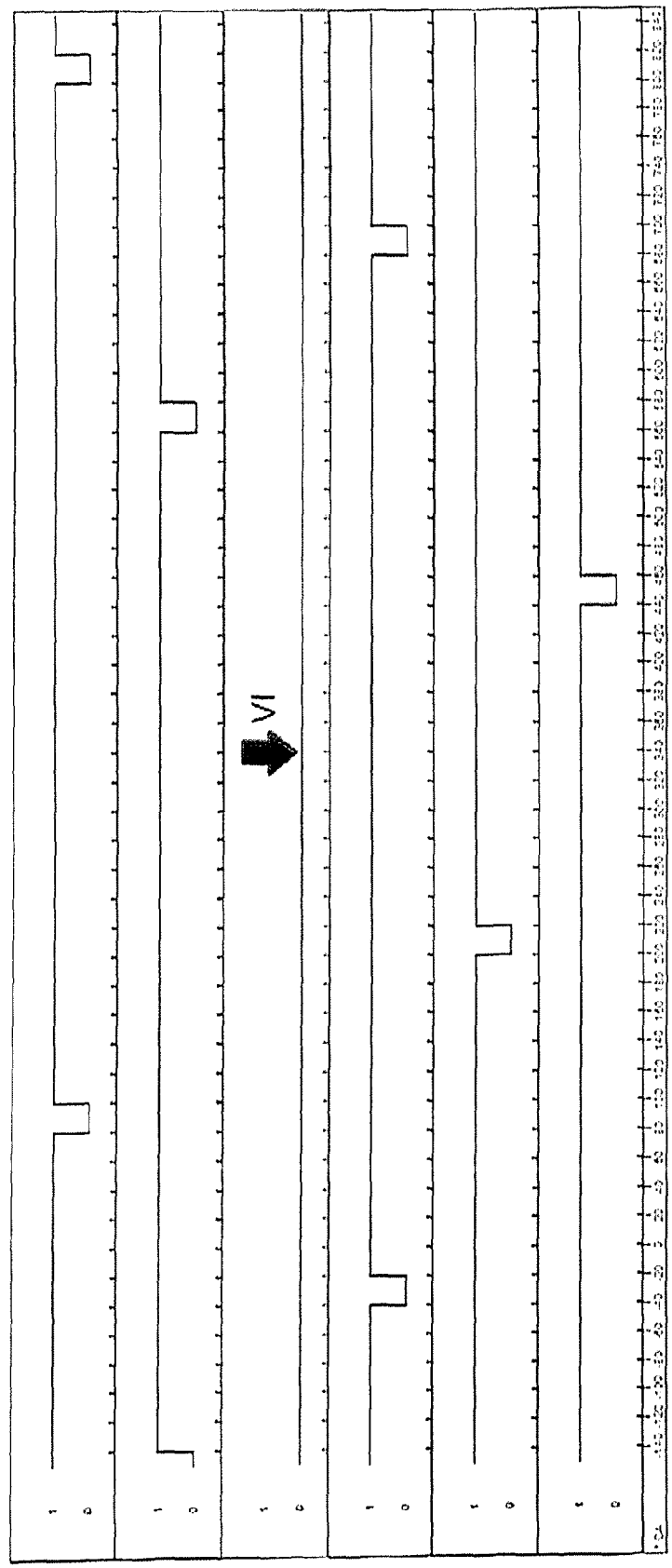
FIG. 2 shows a sequence of trigger pulses for different cylinders of an engine.

FIG. 2 illustrates an example for the signal sequence of the individual line 4 between the engine control device 1 and the ignition control device 2. FIG. 2 shows the voltage level applied to the individual lines 4, in each case as a function of the crankshaft angle of the internal combustion engine. A binary signal is transmitted via the lines 4 so that a differentiation is made only between high and low voltage levels. In the example illustrated in FIG. 2, the trigger signal has failed due to a defect on the third line 4. In the third signal path (from above) in FIG. 2, the voltage level is therefore permanently low, thus zero. At the crankshaft angle indicated by a black arrow and with the ignition system functioning correctly, a trigger signal should be received by the ignition control device 2. This missing trigger signal is compensated by the ignition control device 2.

For this purpose, a firing order in which the ignition devices 3 of the individual cylinders of the combustion engine are to be activated and thus an ignition is to be effected is stored in the ignition control device 2. During an initial setup, the ignition control device 2 can determine the firing order by means of the trigger signals that are correctly received for all cylinders at that time. Another possibility is that the manufacturer stores the firing order in the ignition control device 2. The ignition control device 2 checks continuously if trigger signals for all cylinders are received in the stored firing order. If it is detected that this is not the case, thus trigger signals for one or more cylinders are missing, the ignition control device 2 calculates a substitutional ignition time from at least two trigger signals for the remaining cylinders and activates the respective ignition device 3 according to the calculated substitutional ignition time.

The substitutional ignition time can be calculated, for example, by determining the time interval between the target ignition time of the cylinder in the firing order immediately before the respective cylinder, and this time interval is added to the target ignition time of the cylinder in the firing order immediately before the at least one cylinder for which no trigger signal has been received. In this case, it is assumed for the calculation of the substitutional ignition time that the speed of the engine in the current engine cycle changes only insignificantly and that the time intervals between the target ignition times of the individual cylinders and thus also of the leading edges of the trigger signals are constant.

Such a calculation can be improved in that the time interval between the two target ignition times of the two cylinders in the firing order immediately before the cylinder for which no trigger signal is cyclically received, is corrected by an amount which is determined by evaluating the time intervals between target ignition times of cylinders activated earlier in the firing order, and thus an ongoing change in the speed of the engine is taken into account. Thus, the substitutional ignition time can be calculated by extrapolation of the series of target ignition times of the other cylinders or the corresponding trigger signals.

The ignition control device 2 can be additionally connected to the engine control device 1 via a line 5 via which the ignition control device 2 can communicate to the engine control device 1 whether or not it receives trigger signals for all cylinders. This has the advantage that in the event of a failure of one of the lines 4, the engine control device 1 can avoid engine operating conditions in which a very precise definition of the target ignition time, which cannot be implemented in the case of a failing trigger signal, is required. Such engine operating conditions are sharp accelerations, for example.

The ignition control device 2 can exchange data with the engine control device 1, for example via a CAN bus. In this manner, target ignition angles for the individual cylinders can be communicated to the ignition control device 2, for example. These target ignition angles can be included in the calculation of the substitutional ignition time.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for controlling an internal combustion engine having an ignition control device and a plurality of cylinders, each cylinder having an ignition device connected to the ignition control device, the method comprising:
   setting target ignition times for the individual cylinders using an engine control device, wherein trigger signals based on the target ignition times are transmitted from the engine control device to the ignition control device;
   after receiving a trigger signal, the ignition control device activating the ignition device associated with the trigger signal in order to effect an ignition in the respective cylinder;
   wherein the ignition control device checks whether trigger signals for all cylinders are received in each engine cycle; and
   when it is detected that a trigger signal for at least one cylinder has not been received by the ignition control device and trigger signals have been received by the ignition control device for at least one other cylinder, a substitutional ignition time for the at least one cylinder for which no trigger signal has been received is calculated as a function of at least two trigger signals of the trigger signals that have been received for the at least one other cylinder, and the respective ignition device associated with the at least one cylinder for which no trigger signal has been received is activated according to the calculated substitutional ignition time.

2. The method according to claim 1, wherein the ignition control device stores a firing order in which an ignition is to be cyclically effected in the individual cylinders, and performs a check as to whether trigger signals for all cylinders are received in each engine cycle by checking whether trigger signals for all cylinders are received in the stored firing order by the ignition control device.

3. The method according to claim 1, wherein the ignition control device determines the time intervals between the trigger signals of the individual cylinders and detects a failure of a trigger signal based on an excessively long interval between successive trigger signals.

4. The method according to claim 1, wherein the substitutional ignition time is calculated by determining the time interval between the target ignition times of the cylinders in the firing order before the at least one cylinder for which no trigger signal has been received cylinder, and this time interval is added to the target ignition time of the cylinder in the firing order before the at least one cylinder for which no trigger signal has been received.

5. The method according to claim 1, wherein a first time interval between target ignition times of two cylinders, which are in the firing order immediately before the at least one cylinder for which no trigger signal has been received, is determined, and the substitutional ignition time is calculated by adding a second time interval to the target ignition time of the cylinder which is in the firing order immediately before the cylinder for which no trigger signal has been received and wherein the second time interval is a function of the first time interval.

6. The method according to claim 5, further comprising evaluating time intervals between target ignition times of cylinders activated earlier in the firing order to determine an ongoing change of speed of the engine and calculating the second time interval as a function of the first time interval and the ongoing change of speed of the engine.

7. The method according to claim 1, wherein the ignition control device reports to the engine control device if it does not receive the trigger signals for all cylinders in the stored firing order.

8. The method according to claim 1, wherein the ignition device of the at least one cylinder for which no trigger signal has been received, is activated for a predetermined minimum time period in order to effect an ignition at the substitutional ignition time.

9. The method according claim 1, wherein the ignition control device has a separate inlet for each ignition device.

10. The method according to claim 1, wherein the trigger signals are transmitted to the ignition control device via cable.

11. The method according to claim 1, wherein target ignition angles for each of the plurality of cylinders are communicated to the ignition control device via a CAN bus, and the target ignition angles are included in the calculation of the substitutional ignition time.

12. The method according to claim 1 wherein, for an engine cycle during which the respective ignition device associated with the at least one cylinder for which no trigger signal has been received is activated according to the calculated substitutional ignition time, the ignition device associated with the at least one other cylinder is activated in accordance with a trigger signal transmitted by the engine control device and received by the ignition control device.

* * * * *